(12) United States Patent
DiStasi et al.

(10) Patent No.: US 9,686,051 B2
(45) Date of Patent: Jun. 20, 2017

(54) SYSTEMS, METHODS, AND COMPUTER READABLE MEDIA FOR LOSSLESS DATA TRANSMISSION IN A WIRELESS NETWORK

(71) Applicant: LORD CORPORATION, Cary, NC (US)

(72) Inventors: Stephen J. DiStasi, Colchester, VT (US); Jacob H. Galbreath, Burlington, VT (US); Steven W. Arms, Shelborne, VT (US)

(73) Assignee: LORD Corporation, Cary, NC (US)

( * ) Notice: Subject to any disclaimer, the term of this patent is extended or adjusted under 35 U.S.C. 154(b) by 0 days.

(21) Appl. No.: 14/141,692

(22) Filed: Dec. 27, 2013

(65) Prior Publication Data

US 2015/0188671 A1 Jul. 2, 2015

(51) Int. Cl.
| | |
|---|---|
| H04J 3/00 | (2006.01) |
| H04L 1/18 | (2006.01) |
| H04J 3/06 | (2006.01) |
| H04W 72/04 | (2009.01) |
| H04W 84/18 | (2009.01) |

(52) U.S. Cl.
CPC ............ *H04L 1/189* (2013.01); *H04J 3/065* (2013.01); *H04J 3/0655* (2013.01); *H04L 1/1874* (2013.01); *H04L 1/1877* (2013.01); *H04W 72/0446* (2013.01); *H04W 84/18* (2013.01)

(58) Field of Classification Search
None
See application file for complete search history.

(56) References Cited

U.S. PATENT DOCUMENTS

| | | |
|---|---|---|
| 3,695,096 A | 10/1972 | Kutsay |
| 4,283,941 A | 8/1981 | Kutsay |
| 4,364,280 A | 12/1982 | Kutsay |
| 5,887,351 A | 3/1999 | Arms et al. |

(Continued)

FOREIGN PATENT DOCUMENTS

NO 2010/135379 11/2010

OTHER PUBLICATIONS

Arms, S.W. et al, Energy Harvesting, Wireless, Structural Health Monitoring and Reporting System, 2nd Asia-Pacific Workshop on SHM, Melbourne, Dec. 2-4, 2008, 15 pages.

(Continued)

*Primary Examiner* — Feben M Haile
(74) *Attorney, Agent, or Firm* — James M. Leas

(57) ABSTRACT

Systems, methods, and computer readable media for providing lossless transmission of sensor data in a wireless network are provided. In some aspects, a method for transmitting data in a wireless sensor network includes collecting data at a sensor node, attaching a timestamp to the data, buffering the data and the timestamp to a memory device and retransmitting the collected data where the sensor node fails to receive an acknowledgement message from the base station after the data transmission. In some aspects, a system can include a plurality of wireless sensor nodes having synchronized clocks and a base station. Collected sensor data can be associated with a timestamp via the clock prior to transmitting the data to the base station. The data can be buffered at a memory device and retransmitted therefrom to provide lossless data transmission.

18 Claims, 4 Drawing Sheets

(56) References Cited

U.S. PATENT DOCUMENTS

| | | |
|---|---|---|
| 6,433,629 B2 | 8/2002 | Hamel et al. |
| 6,529,127 B2 | 3/2003 | Townsend et al. |
| 6,629,446 B2 | 10/2003 | Parker |
| 6,714,763 B2 | 3/2004 | Hamel et al. |
| 6,871,413 B1 | 3/2005 | Arms et al. |
| 7,081,693 B2 | 7/2006 | Hamel et al. |
| 7,143,004 B2 | 11/2006 | Townsend et al. |
| 7,170,201 B2 | 1/2007 | Hamel et al. |
| 7,188,535 B1 | 3/2007 | Spletzer |
| 7,256,505 B2 | 8/2007 | Arms et al. |
| 7,428,232 B2 | 9/2008 | Park et al. |
| 7,461,560 B2 | 12/2008 | Arms et al. |
| 7,478,108 B2 | 1/2009 | Townsend et al. |
| 7,639,135 B2 | 12/2009 | Arms et al. |
| 7,653,397 B2 | 1/2010 | Pernu et al. |
| 7,664,532 B2 | 2/2010 | Palin et al. |
| 7,668,667 B2 | 2/2010 | Robb et al. |
| 7,692,365 B2 | 4/2010 | Churchill et al. |
| 7,719,416 B2 | 5/2010 | Arms et al. |
| 7,764,958 B2 | 7/2010 | Townsend et al. |
| 7,778,603 B2 | 8/2010 | Palin et al. |
| 7,809,012 B2 | 10/2010 | Ruuska et al. |
| 7,839,058 B1 | 11/2010 | Churchill et al. |
| 8,024,980 B2 | 9/2011 | Arms et al. |
| 8,290,747 B2 | 10/2012 | Hamel et al. |
| 2005/0105231 A1 | 5/2005 | Hamel et al. |
| 2005/0116544 A1 | 6/2005 | Hamel et al. |
| 2005/0116545 A1 | 6/2005 | Hamel et al. |
| 2005/0146220 A1 | 7/2005 | Hamel et al. |
| 2008/0082891 A1 | 4/2008 | Park et al. |
| 2008/0143512 A1* | 6/2008 | Wakisaka et al. ............ 340/504 |
| 2009/0323716 A1 | 12/2009 | Chintalapudi et al. |
| 2010/0135263 A1* | 6/2010 | Zakrzewski .................. 370/338 |
| 2011/0158806 A1 | 6/2011 | Arms et al. |
| 2011/0211461 A1 | 9/2011 | Bahr et al. |
| 2011/0261747 A1* | 10/2011 | Wang et al. .................. 370/315 |
| 2012/0020445 A1 | 1/2012 | DiStasi et al. |
| 2014/0257730 A1* | 9/2014 | Czompo ........................ 702/89 |

OTHER PUBLICATIONS

Arms, S.W. et al, Energy Harvesting Wireless Sensors and Networked Timing Synchronization for Aircraft Structural Health Monitoring, Proceedings of the First International Conference on Wireless Commu8ndiations, Vehicular Technology, Information Theory and Aerospace & Electronic Systems Technology (Wireless VITAE), Aalborg Congress and Culture Centre, Aalborg, Denmark, May 17-20, 2009, pp. 16-20.

Arms, Steven W. et al., Synchronized System for Wireless Sensing, RFID, Data Aggregation, & Remote Reporting, AHS Forum 65, Grapevine, TX, May 29-31, 2009, 7 pages.

Microstrain, Extended Range Synchronized (mXRS) Wireless Sensing System FAQs, Microstrain Inc., Williston, Vermont, Dec. 6, 2010, 3 pages.

Microstrain, WSDA-Base-mXRS Wirless Base Station Technical Product Overview, Microstrain, Inc., Williston, TX, 2010, 2 pages.

Townsend, C.P. et al., Micro-Power Wireless Strain Sensor for Rotorcraft Applications, AHS Forum 68, Fort Worth, TX, 2012, 6 pages.

* cited by examiner

SYSTEMS, METHODS, AND COMPUTER READABLE MEDIA FOR LOSSLESS DATA TRANSMISSION IN A WIRELESS NETWORK

TECHNICAL FIELD

The subject matter disclosed herein relates generally to systems, methods, and computer readable media for lossless data transmission in a wireless network. More particularly, the subject matter disclosed herein relates to systems, methods, and computer readable media for lossless transmission of sensor data in a wireless network via wireless sensor nodes and a base station.

BACKGROUND

Wireless communications combined with energy harvesting techniques can provide aspects of wireless communication networks useful for measuring and wirelessly transmitting data. Wireless communication networks can be configured to measure and/or transmit data to a base station for a variety of applications including, inter alia, environmental monitoring, structural monitoring, military monitoring, medical monitoring, machine monitoring, active cell balancing of battery packs, equipment structural health tracking (e.g., tracking precursors to crack formation and propagation), measurement of strains, loads, torques, fatigue, forces, vibrations, displacements, temperatures, combinations thereof and/or any other application where continuous data collection and/or condition based sensing techniques are useful. A wireless sensor network can offer advantages such as reduced maintenance cost, increase mission readiness, and enhanced overall safety.

Currently, lost data is an accepted downside of wireless networks. The network size, low cost, and dependence on small energy sources has limited the use of expensive data buffers and retransmission methods which would overcome the faulty nature of low cost, low power radio transceivers.

Accordingly, there is a need for improved systems, methods, and computer readable media for efficient and lossless data transmission of sensor data in a wireless sensor network.

SUMMARY

According to one aspect, the subject matter described herein can comprise a method for lossless data transmission in a wireless network, including wireless sensors. The method can include attaching a timestamp to collected sensor data, writing the sensor data to a memory, transmitting the sensor data and the timestamp to a base station during a predetermined transmission time slot, transmitting, from the base station, a data packet which includes the sensor data and the timestamp to an end user, and transmitting an acknowledgement message from the base station back to the sensor node.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein can include non-transitory computer readable media such as, for example and without limitation, disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more hardware processors, memory, and a wireless link.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

DETAILED DESCRIPTION

Figure 1:
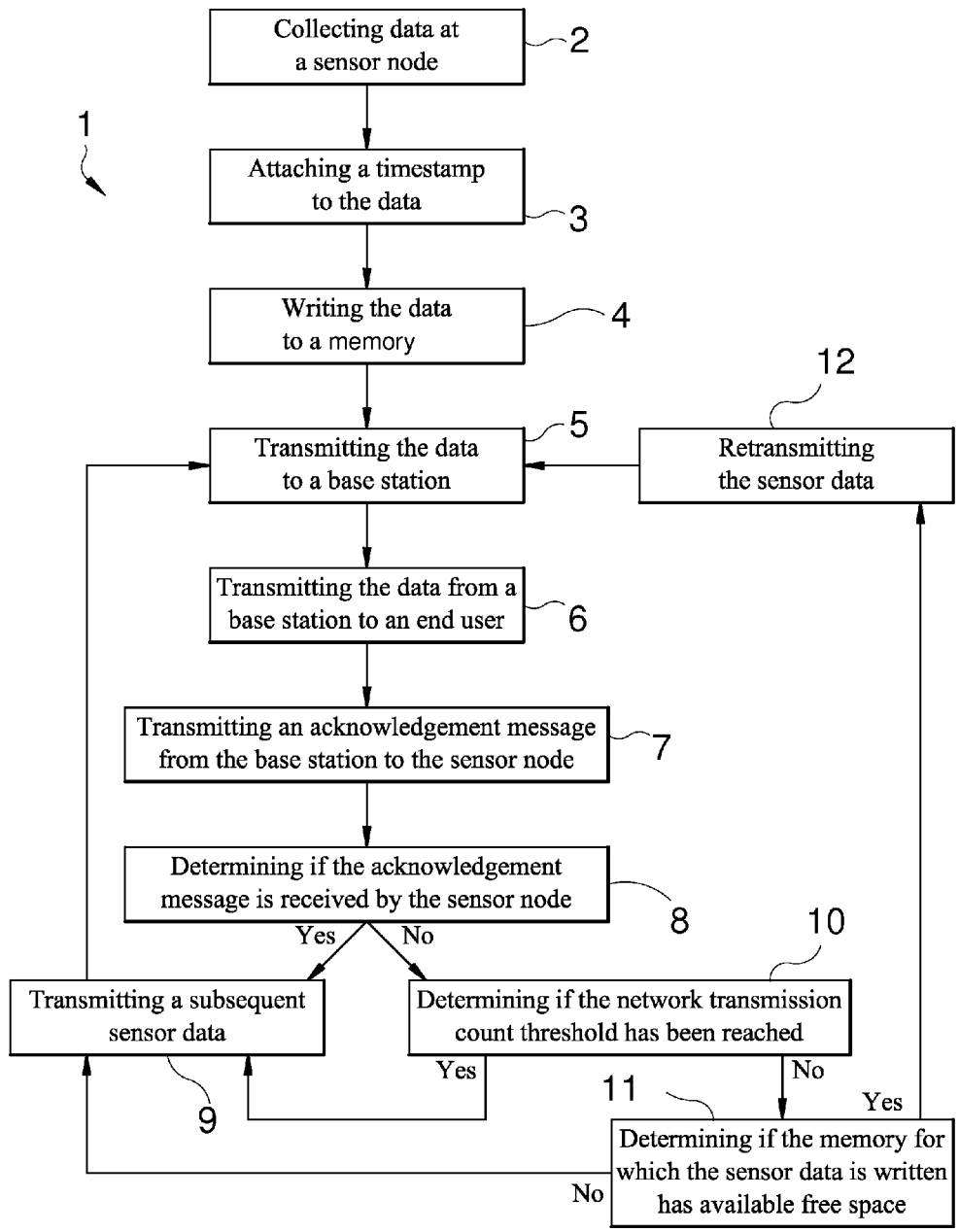
FIG. 1 is a flow chart illustrating an exemplary method for transmitting data in a wireless sensor network in accordance with aspects of the subject matter described herein.

In accordance with the description herein and exemplary, associated drawings, novel methods, systems, and computer readable media are disclosed for lossless data transmission in a wireless sensor network. Such methods, systems and computer readable media are particularly suitable for use, for example and without limitation, for transmitting wireless sensor data to an end user via a base station. In some aspects, a base station can comprise a data aggregator node, which can collect and store data from the wireless sensors. In some aspects, the base station can trigger the transmission of data from one or more wireless sensor nodes via transmission of a beacon signal thereto.

Sensor data can be important for a variety of applications including, inter alia, environmental monitoring, structural monitoring, military monitoring, medical monitoring, machine monitoring, active cell balancing of battery packs, equipment structural health tracking (e.g., tracking precursors to crack formation and propagation), measurement of strains, loads, torques, fatigue, forces, vibrations, displacements, temperatures, combinations thereof and/or any other application where continuous data collection and/or condition based sensing techniques are useful. Losing data, whether through wireless failure, corruption, and/or dropping packets, can lead to "holes" in the monitoring process, which can lead to catastrophic results. For example, losing data indicative of a heavy vibration or large crack formation could lead to catastrophic failure of a structure or machine. Notably, novel systems, and computer readable media are disclosed herein for providing lossless data transmission in a wireless sensor network, whereby "holes" in the monitoring process can be eliminated, or greatly reduced. In some aspects, systems and methods described herein can achieve approximately 100% data throughput via buffering, transmission of acknowledgements, and retransmission of lost or dropped data.

To compensate for lost, corrupted, or dropped data within a wireless sensor network, a buffer memory can be integrated within a wireless sensor node to store sensor data as it is collected using one or more sensors. As the sensor data is being converted to digital data through an analog to digital (a/d) converter, timestamps can be attached to the data via a precision timekeeping device within the sensor node. The timestamped sensor data can then be sent to a base station during a predetermined transmission time slot to be forwarded to an end user.

In some aspects, the base station can be configured to send an acknowledgement (i.e., ACK) message back to the sensor node acknowledging receipt of the transmitted sensor data. In some aspects, the sensor node can be configured to look for the acknowledgement message. If the sensor node receives the acknowledgement message successfully, it will continue to transmit subsequently collected sensor data. Alternatively, if the sensor node does not receive the acknowledgement message, it can attempt to retransmit the same data at a next predetermined transmission time slot.

In some aspects, additional bandwidth can be assigned to the sensor network to accommodate the retransmission and recovery of lost data. The amount of bandwidth necessary can depend on factors such as sample rate, number of active sensor channels, and data type. In addition, transmission power of the sensor node and the base station can be dynamically adjusted to reduce the overall data drop rate of the wireless network.

In some aspects, each wireless sensor node of wireless systems or networks described herein can comprise a sensor. In some aspects, the sensor can comprise a strain sensor, a vibration sensor, a load cell, a torque sensor, a pressure sensor, an accelerometer or any other device configured to measure a change in any physical phenomena of a structure, material, device, or other physical entity. The sensors can measure and collect data which can be transferred to a base station. Notably, systems and methods described herein can prevent data from being lost during the wireless transmission thereof, in part, using buffering and acknowledgement messaging between nodes.

FIG. 1 is a flow chart depicting an exemplary method, generally designated 1, for attaining lossless data transmission in a wireless sensor network according to one embodiment of the subject matter described herein. At step 2, various types and/or forms of parameters or data can be collected at a wireless sensor node, such as a wireless sensor node. For example, sensors can measure and collect data including strains, accelerations, torques, forces, temperatures, displacements, combinations thereof, and/or any other type of variation or change in physicality of a structure, machine, or material. At step 3, a timestamp can be attached to the collected parameters or data. The timestamp can be indicative of the time at which the data was collected.

In some aspects, the sensor node can include a precision timer keeper (e.g., 18, FIG. 3) and an analog to digital (a/d) converter configured to attach the timestamp to the collected digital parameters or data. That is, after the data is collected at the sensor, the data can be converted into digital form via an a/d conversion circuit, and the timestamp can be attached to the collected data at the time the a/d conversion is made. The timestamped digital data can be written (or buffered) into memory and/or a hardware memory device via a processor in the order that the data was collected at the sensor, as shown in step 4. The memory can comprise a volatile or non-volatile memory device, such as a SRAM, DRAM, FRAM, or a flash memory. In addition, the memory can comprise circular memory; such that sensor data can be stored in the memory in accordance to the order the data is collected. The memory can comprise an additional buffer memory, such as a FRAM with fast serial read and write speeds.

At step 5, the timestamped sensor data can be transmitted to a base station during a predetermined transmission time slot. In some aspects, the predetermined transmission time slot can be a pre-allocated TDMA slot using TDMA protocol or methodology, and additional information such as sample rate, sensor node identification, and/or active sensor channel information can also be sent along with the sensor data during the predetermined transmission time slot. In some aspects, the base station can qualify the data based on a received cycle redundancy check or a checksum tagged on by the wireless sensor node. For example and in some aspects, the base station can comprise a Wireless Sensor Data Aggregator (WSDA). The WSDA can be configured to synchronize timekeepers disposed at each wireless sensor nodes in the network with a beacon broadcast, which can itself be synchronized through GPA, Ethernet, or an internal clock. The WSDA can collect all data being transmitted by each sensor node in the network, and store it locally. This data can be downloaded later, pushed to a cloud drive, or a third party serial device. WSDA settings and information can also be accessed or configured remotely, where desired.

At step 6, the base station can transmit a data packet including the qualified (e.g., checked as described hereinabove) sensor data and the timestamp to an end user. Furthermore, the base station can then transmit an acknowledgement message back to the sensor node as illustrated in step 7. At step 8, the sensor node can be configured to determine if the acknowledgement message has been received. For example, the sensor node can include a transceiver configured to listen for the acknowledgement message from the base station. If the acknowledgment message is received for a given sensor data, step 9 can be performed to transmit a subsequently collected sensor data, from the sensor node, to the base station. Alternatively, if the acknowledgment message is not received for a given sensor data, step 10 can be performed.

Still referring to FIG. 1 and at step 10, it can be determined if a retransmission count threshold within the sensor node has been reached or not. The retransmission count threshold can comprise a programmable system limit of the sensor node. For example, the retransmission count threshold can be set to 10,000 in general, or, for a sensor node that may consistently move in and out of communication range, the threshold can be set to unlimited to ensure successful transmission of data from that sensor. If the retransmission count threshold has been reached, subsequently collected sensor data can be transmitted from the sensor node to the base station as indicated at step 9. Alternatively, if the retransmission count threshold has not been reached, a determination as to whether there was sufficient free space in the memory to store newly collected sensor data must be performed as indicated at step 11.

If there was sufficient space in the memory to store new sensor data, and an acknowledgement message was not received for a given sensor data, the sensor node can go ahead and retransmit the buffered (e.g., stored in memory, step 4) sensor data to the base station at step 12. Alternatively, if there was insufficient space in the memory to store new sensor data, the sensor node can perform step 9 and transmit the sensor data that was subsequently collected.

In some aspects, the sensor node can be configured to transmit more than one subsequently collected sensor data during a predetermined transmission time slot, therefore making up for time lost by prior data retransmissions. Transmitting a greater amount of sensor data can prevent the sensor memory from overflowing due to transmission error accumulation, and the predetermined transmission time slot can be configured to allow sufficient duration for transmitting the greater amount of sensor data. In addition, extra bandwidth can be allocated to the sensor nodes for retransmission and recovery of lost data. For example, 20% additional bandwidth can be made available to a sensor node, and then it will take 5 seconds to fully recover from 1 second of lost data. The extra bandwidth can be allocated from a remote controller or hardware component that recognizes the need to allocate more space to a specific node.

When a sensor data (e.g., packet) drop rate within the network is high, the transmission power can be adjusted accordingly. For example, the sensor node and/or base station can be configured to monitor a network's packet error rate and/or a received signal strength indication parameter. When either the packet error rate or the strength indication parameter indicates a high failure and/or a potential for transmission failure, a message can be communicated between the wireless sensor node and the base station requesting an increase in transmission power. Alternatively, according to some embodiments, the node can make adjustments to the transmission power level based on the retransmission attempts and number of data points in the buffer memory. Similarly, the transmission power may be decreased if a data transmission failure rate within the wireless network is determined to be low.

Furthermore, a maximum sensor network data buffer time can be pre-programmed by selecting an appropriate buffer memory size. According to one aspect, the total number of minutes of sensor data that the memory can hold, T can be determined by Equation (1) below:

$$T=M/(((S\times(C\times N)+1))+4)\times 60),\qquad \text{Eq. (1)}$$

where:
M is the number of bytes in the memory;
S is the sample rate;
C is the number of active sensors/channels;
N is the number of bytes/sample;

For example, a 230,000 bytes FRAM can be used as the buffer memory, and at a sample size of 2 bytes per sample, a sample rate of 32 Hz, and collecting from 3 active sensors, the FRAM memory can store over 20 minutes of sensor data if the sensors were outside the communication range of the base station. Once the sensors resume communication with the base station, the data can be recovered without any loss. Similarly, data losses can be reduced in other applications where sensor node communication with the base station is intermittent or cannot be attained. For example, sensor nodes can be placed inside a metallic structure or a moving vehicle, where line of sight communication suffers from significant multipath interference; or sensor nodes may be placed in close proximity to WiFi or Bluetooth devices, where data communication can suffer from high levels of external radio interferences. Furthermore, data losses due to sensor node's intermittent or unreliable power sources can also be reduced. For example, a sensor node can be supported by an energy harvesting apparatus.

In scenarios where the sensor node loses its power source, data that was previously saved to the FRAM buffer memory can be recovered when the node regains power and resynchronizes with the network. In addition, buffer memory can also be useful for data reduction purposes. For example, instead of transmitting raw data, segments of the data can be loaded from the large buffer at timed intervals and acted on by predetermined algorithms to reduce the data content to what is actually useful to the end user. In this way, significant energy can be saved by limiting the amount of transmitted data.

Figure 2:
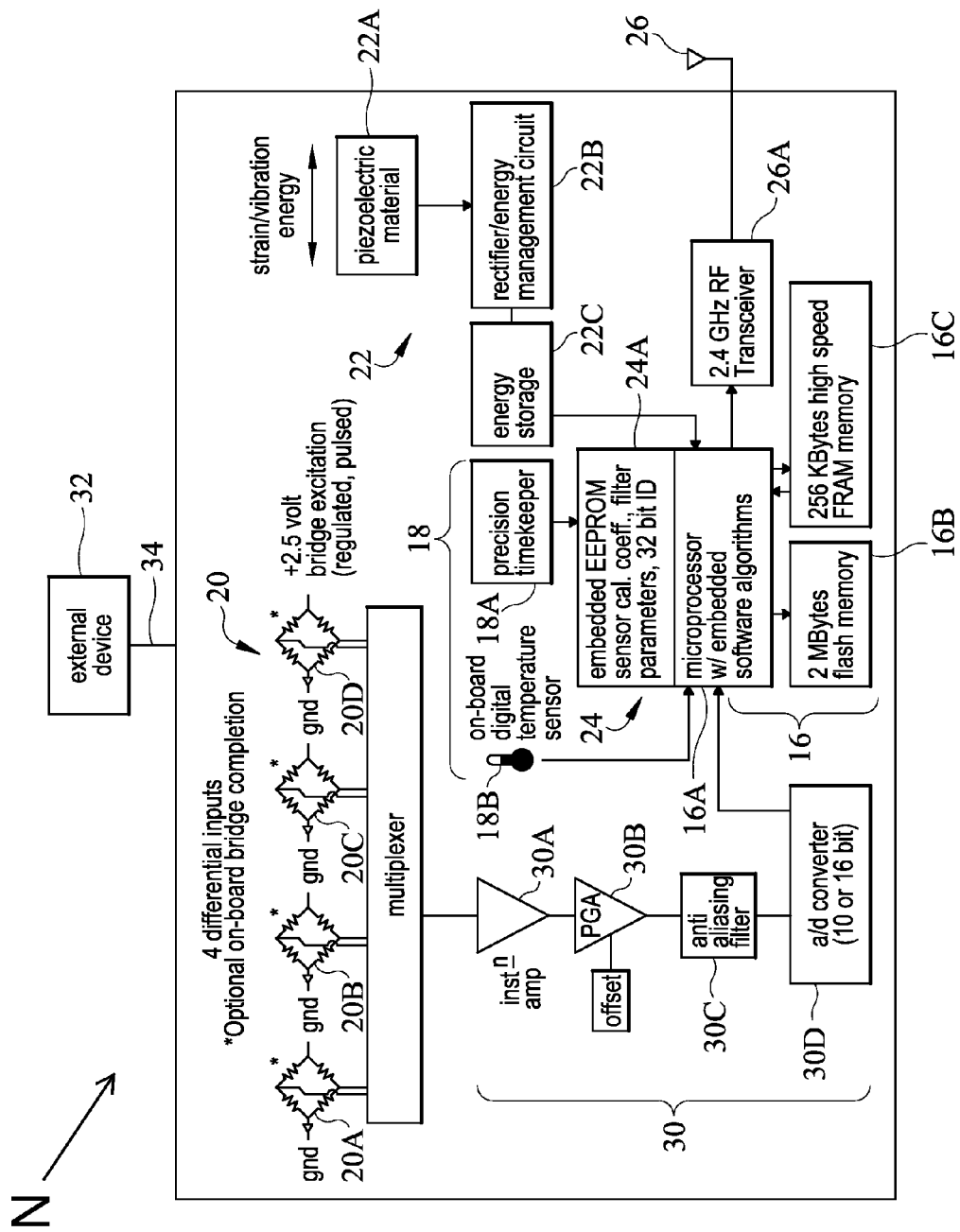
FIG. 2 is a block diagrams illustrating a sensor node according to an aspect of the subject matter described herein.

FIG. 2 depicts an exemplary illustration of a wireless sensor node, generally designated N, which can be configured to collect and transmit data in a wireless sensor network. As shown in FIG. 2, each wireless sensor node can comprise a plurality of sensors, generally indicated 20. In some aspects, four sensors 20A to 20D can be provided. In some aspects, each sensor 20A to 20D can comprise a network of four resistive legs. Wireless sensor nodes having more than or less than four sensors can also be provided. In some aspects, one or more of the resistive legs of each Wheatstone bridge sensor 20A to 20D can comprise active sensing elements. That is, a physical phenomenon, such as a change in temperature, vibration, torque, strain, stress, force, etc., can change the resistance of sensing elements within sensors 20A to 20D. Sensors can transmit the data collected by each sensor 20A to 20D to a base station in response to receiving a beacon signal from the base station, or on a programmed basis. Prior to transmitting the collected data to a base station, notably, the data can be stored or buffered within a memory device, such as FRAM 16C.

In some aspects, the one or more sensors 20A to 20D can be attached to a sensor signal chain 30 or signal chain circuitry, which can include circuitry configured to transform the sensor measurements into data for compiling and sending to the base station. In some aspects, signal chain 30 comprises a multiplexer connected to an instrumentation amplifier 30A, gain amplifier with offset adjust 30B, an anti-aliasing filter 30C, and a 10- or 16-bit analog to digital (a/d) converter 30D.

The wireless sensor node N can further comprise a clock 18. Notably, clocks of each node in a network can be synchronized. In some aspects, clock 18 can comprise a RTC having a precision timekeeper 18A and an on-board digital temperature sensor 18B configured to keep accurate time. The precision timekeeper 18A can be connected to a counter 24, and the on-board digital temperature sensor 18B can be connected to a microprocessor 16B. In some aspects, counter 24 can be configured to synchronize precision timekeeper 18 of each wireless sensor node with respect to a standard. Precision timekeeper 18A can also connected to a microprocessor 22 via counter 24. In some aspects, highly accurate clocks, such as atomic clocks, can be used within each wireless sensor node to provide the synchronized RTCs.

The wireless sensor node N can further comprise power circuitry, generally designated 22. In some aspects, power circuitry comprises energy harvesting components including a piezoelectric material 22A for converting mechanical energy (e.g., strain and/or vibrations) into electrical energy. The energy can pass through a rectifier/energy management circuit 22B and be stored by an energy storage device 22C. Power circuitry 22 can be connected to power all components. Notably, energy harvesting can provide power for multiple components within the wireless sensor node, such that wireless sensors can be self-sufficient and/or self-sustaining with respect to energy use, and can be placed in a plurality of different locations and/or environmental conditions.

In some aspects, the wireless sensor node N can comprise at least one processor and/or memory device, the combination of which is designated 16. Processor/memory 16 can comprise at least one hardware microcontroller or microprocessor 16A including computer readable media and/or software embedded therein. Microprocessor 16A can be connected to a 2.4 GHz transceiver chip 26A of a wireless link, such as transceiver 26. Microprocessor 16A can also be connected to sensor signal chain 30 and components thereof. Microprocessor 16A can further be connected to one or more memory devices, such as 2 MB of non-volatile memory 16B and 256 kB of high speed ferroelectric-RAM (FRAM) memory 16C for buffering timestamped data.

For example only and without limitation, in some aspects microprocessor 16A can comprise a PIC18F4620 microcontroller available from Microchip Technology, Inc. located in Chandler, Ariz. In further aspects, and for example only without limitation, transceiver chip 26A can comprise a CC2420 transceiver chip available from Texas Instruments, Inc., located in Dallas, Tex. In further aspects, and for example only without limitation, precision timekeeper 18A can comprise a DS3234 RTC available from Maxim Integrated Products located in San Jose, Calif.

In some aspects, microprocessor 16A can be configured to execute firmware embedded within memory of each wireless sensor node for performing wireless data transmission, data logging to a non-volatile memory, 10-, 12-, or 16-bit A/D conversion, and for performing synchronized sampling within +/−30 microseconds of the reference beacon. In further aspects, microprocessor 16A can be configured to execute instructions stored in memory of each wireless sensor node for providing a programmable sampling rate of 1 sample per day to 512 samples per second, buffering transmissions for power conservation, responding with an acknowledgement to one or more base stations of a wireless network, automatically retransmitting dropped data packets, and for executing TDMA transmission scheduling.

In some aspects, a base station can be configured to provide synchronized control over one or more wireless sensor nodes, or devices connected thereto, by transmitting or communicating one or more control instructions or control commands encoded within time slots of a common beacon or a node-specific beacon over a wireless link to transceiver chip 26A. In some aspects, actions that may be synchronized can comprise connecting or disconnecting power, opening or closing a switch, activating or deactivating a relay, controlling an actuator, controlling a digital to analog (d/a) converter to provide a specified analog voltage, or controlling a pulse width modulation (PWM) process. In some aspects, multiple wireless sensor nodes can be configured to control or induce an action from an external device 32, such as a battery, a vehicle, a transducer, or a sensor via a data bus or wire 34.

Figure 3A:
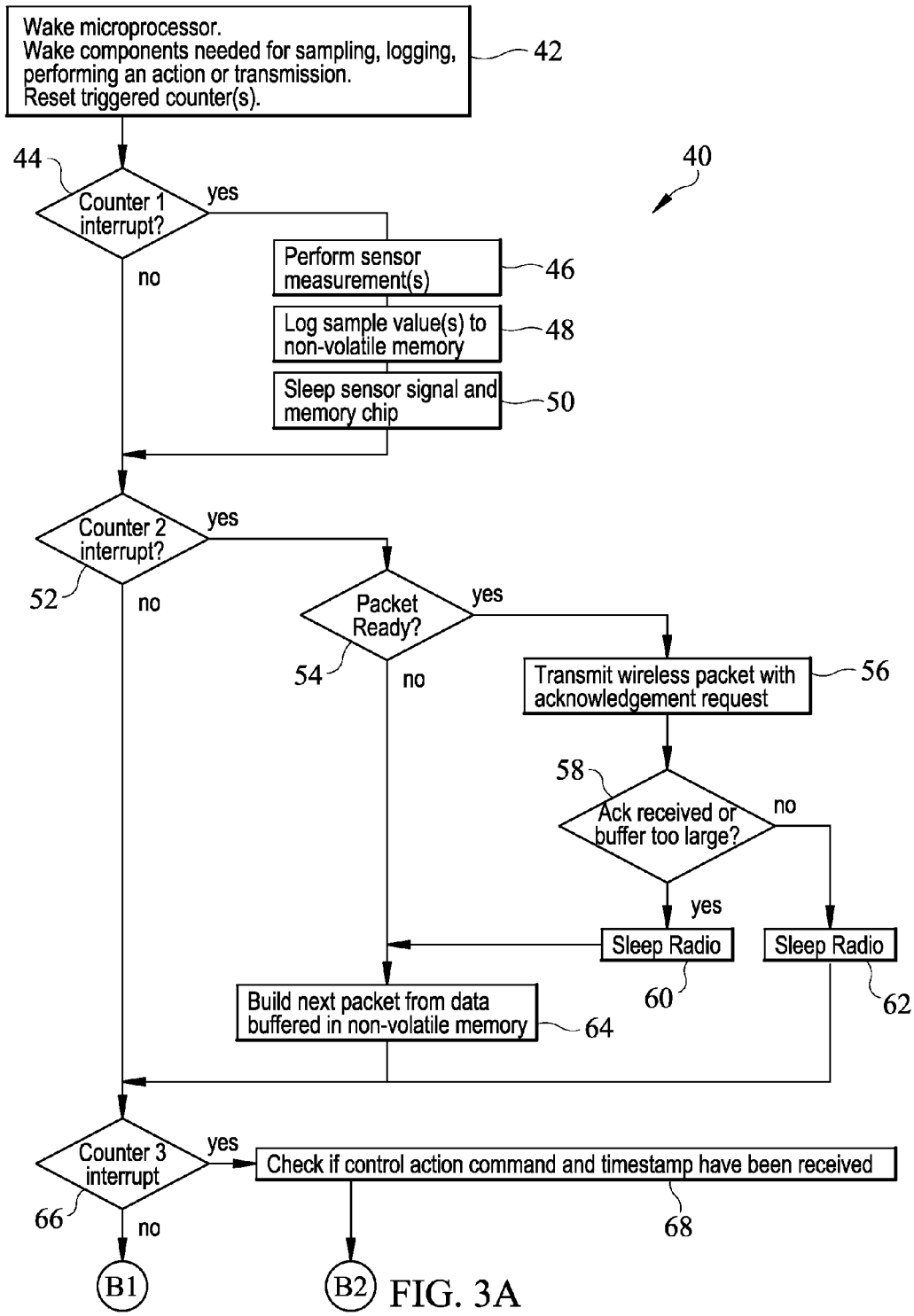
FIGS. 3A and 3B are portions of a flow diagram for transmitting data in a wireless sensor network according to an aspect of the subject matter described herein.
Figure 3B:
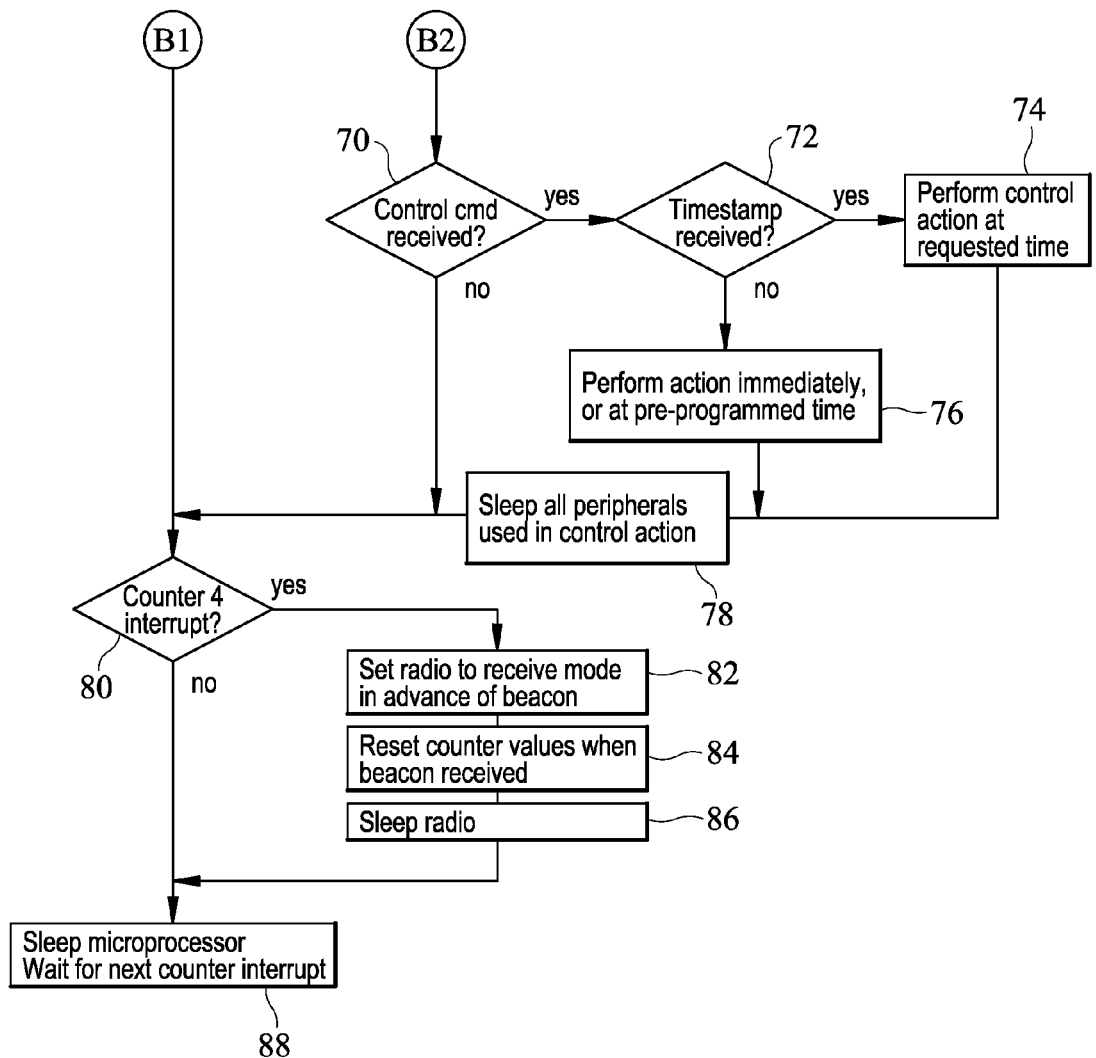

FIGS. 3A and 3B collectively illustrate a flow diagram illustrating an exemplary methodology, generally designated 40, for lossless data transmission occurring within a wireless sensor network. In some aspects as discussed with respect to FIG. 2 hereinabove, each wireless sensor node can comprise a high precision, temperature compensated timekeeper or clock, and a microprocessor that includes a counter (e.g., 24, FIG. 2). The output of the timekeeper (e.g., 18A, FIG. 2) can be directly linked to an input port on the microprocessor (e.g., 16A, FIG. 2). In some aspects, the timekeeper can tick at regular intervals, and each tick can be counted by the counter (e.g., 24, FIG. 2) of the microprocessor (e.g., 16A, FIG. 2 so that actions may be performed at specific preset values of the counter. In this way, actions such as, inter alia, waking up the microprocessor from sleep mode, sampling a sensor, logging data, transmitting data, and resetting triggered counters can occur at controlled preset times or time intervals.

In block 44, the timekeeper provides ticks to a first counter or counter 1 that determines a time for sensor measurements. A second counter or counter 2 in block 52 can determine a time for transmitting data. A third counter or counter 3 in block 66 can determine a time for checking whether a control action command and a timestamp have been received. A fourth counter or counter 4 in block 80 can set the radio into receive mode in advance of a beacon signal sent by a base station. When one of these counters reaches a preset value, it sends an interrupt signal that wakes microprocessor 16A (FIG. 2) from sleep mode, wakes components needed for sampling and logging, performs an action or transmission, and resets the respective counter, as shown in block 42.

According to block 44, where counter 1 provides the interrupt signal, microprocessor 16A (FIG. 2) is configured to direct sensors to perform sensor measurements and log data to non-volatile memory, as shown in blocks 46 to 48. Then microprocessor 16A (FIG. 2) can direct sensor signal chain (30, FIG. 2) and memory chips (16B, 16C, FIG. 2) to sleep mode, as shown in block 50.

According to block 52, if counter 2 provides the interrupt signal, microprocessor 16A (FIG. 2) can be configured to direct a packet to be built from the logged sensor data in non-volatile memory, and can cause transceiver (26, FIG. 2) to transmit the data, as shown in blocks 54 to 56. If an acknowledgement is received from base station or a buffer is too large then the microprocessor can direct transceiver/radio to sleep mode as shown in blocks 60 and 62. A next packet can be built as shown in block 64. This loop can continue as counter 2 provides the interrupt signal.

According to block 66, if counter 3 provides the interrupt signal, then microprocessor 16A (FIG. 2) can check to determine whether a control action command has been received as shown in blocks 68 and 70 spanning FIGS. 3A and 3B. If so, then microprocessor 16A (FIG. 2) can check to determine whether a timestamp has been received as shown in block 72 of FIG. 3B. If a control command and a timestamp have been received, then microprocessor 16A (FIG. 2) can perform the control action at the time specified by the timestamp, as shown in block 74. If no timestamp has been received, then in some aspects microprocessor 16A (FIG. 2) can perform the control action immediately or at a time pre-programmed in the wireless sensor node, as shown in block 76. To save energy, microprocessor 16A (FIG. 2) can then be configured to set wireless sensor node in sleep mode as shown in block 78.

According to block 80, if counter 4 provides the interrupt signal, then microprocessor 16A (FIG. 2) can set the transceiver to receive mode in advance of receipt of a beacon packet from base station and can reset all counter values when the beacon is received, as shown in blocks 82 and 84. Microprocessor can then be configured to direct transceiver (e.g., radio) to sleep as shown in block 86. Then, to avoid being idle and to conserve energy, microprocessor 16A can enter sleep mode until the next counter interrupt signal arrives, as shown in block 88.

While the present subject matter has been has been described herein in reference to specific aspects, features, and illustrative embodiments, it will be appreciated that the utility of the subject matter herein is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter herein as hereinafter claimed is intended to be broadly construed and interpreted, as including all such variations, modifications and alternative embodiments, within its scope and including equivalents of the claims.

What is claimed is:

1. A method for lossless data transmission in a wireless sensor network, the method comprising:
    configuring the wireless sensor network, wherein the wireless sensor network has a plurality of wireless sensor nodes, at least one base station, a first bandwidth and a second bandwidth, the second bandwidth being greater than first bandwidth;
    receiving a coordinated universal time (UTC) timestamp at each of the wireless sensor nodes from the at least one base station, wherein each of the wireless sensor nodes synchronizes an internal clock to the received UTC timestamp;
    sequentially collecting a sensor data sample at each of the wireless sensor nodes, wherein each wireless sensor node has its own sensor data samples being collected;
    attaching a timestamp to the collected sensor data samples in each of the wireless sensor nodes;
    buffering the timestamped sensor data samples to a memory device, wherein at least one memory device is positioned within each of the wireless sensor nodes and wherein each of the timestamped sensor data samples are buffered in a format where the first of the timestamped sensor data samples buffered is the first of the timestamped sensor data samples to be transmitted;
    sequentially transmitting the timestamped sensor data samples to the base station during a predetermined transmission time slot, wherein the transmitting includes transmitting at least one of timestamped sensor data samples and, when the first bandwidth permits, transmitting additional timestamped sensor data samples up to the a maximum allowable bandwidth of the first bandwidth;
    determining if an acknowledgement message from the base station is received; and
    retransmitting the at least one timestamped sensor data sample where one or more of the sensor nodes fail to receive an acknowledgement message from the base station after the timestamped sensor data sample transmission, wherein the retransmission of the at least one timestamped sensor data sample involves transmitting as many of the timestamped sensor data samples as possible up to a maximum allocated bandwidth of the second bandwidth.

2. The method of claim 1, wherein the sensor node is configured to continue retransmitting the timestamped sensor data samples until an acknowledgement message is received.

3. The method of claim 1, wherein the timestamped sensor data samples are stored as a data packet that are configured to transmit information about the one of the sensor nodes associated with the timestamped sensor data samples, including number of retransmission attempts made by the sensor node, sensor calibration coefficients, power supply level, or transmission power level.

4. The method of claim 1, wherein the at least one memory device comprises a volatile or non-volatile memory device.

5. The method of claim 1, further comprising determining if a total number of retransmission attempts has exceeded a retransmission count threshold before retransmitting the timestamped sensor data samples, and wherein the retransmission count threshold is a pre-determined integer number.

6. The method of claim 5, wherein, if the total number of retransmission attempts has exceeded the retransmission count threshold, then the retransmission is discontinued and a subsequently recorded timestamped sensor data sample is transmitted.

7. The method of claim 1, further comprising determining if the memory device has available free space prior to retransmitting the timestamped sensor data samples.

8. The method of claim 7, wherein, if the memory device does not have available free space, then the retransmission is discontinued and a subsequently timestamped sensor data sample is transmitted.

9. The method of claim 1, further comprising dynamically adjusting a data transmission power of the sensor node according to the wireless sensor network's received signal strength indication (RSSI) or data packet error rate.

10. The method of claim 1, further comprising transmitting from the base station a data packet, which includes the qualified sensor data and the timestamp to an end user.

11. A system for transmitting data in a wireless sensor network, the system comprising:
    a first bandwidth associated with the wireless sensor network;
    a second bandwidth associated with the wireless sensor network, the second bandwidth being greater than the first bandwidth;
    at least one wireless sensor node comprising:
        a sensor adapted to collect data;
        a time keeping device for generating a timestamp associated with a time at which the data as collected;
        at least one memory device for sequentially storing the collected timestamped data;
        a transceiver configured to sequentially transmit the stored timestamped data, the transmitting includes transmitting at least one of timestamped data during a predetermined transmission time slot and, when the first bandwidth permits, transmit additional timestamped data up to the a maximum allowable bandwidth of the first bandwidth;
    a base station configured to receive the transmitted stored timestamped data transmit an acknowledgement message to the wireless sensor node upon receipt of the stored timestamped data; and
    wherein each wireless sensor node is configured to retransmit more than one of the sequentially stored timestamped data when the acknowledgement message is not received, the retransmission of the stored timestamped data involves transmitting as many of the stored timestamped data as possible up to a maximum allocated bandwidth of the second bandwidth.

12. The system of claim 11, wherein the wireless sensor node is configured to retransmit the timestamped data until the acknowledgement message is received from the base station.

13. The system of claim 11, wherein the wireless sensor node is configured to transmit additional sensor node information including a number of retransmission attempts made by the sensor node, one or more sensor calibration coefficients, a power supply level, or a transmission power level.

14. The system of claim 11, wherein the at least one memory device comprises a volatile or non-volatile memory device.

15. The system of claim 14, wherein the volatile or non-volatile memory device is integrated within the wireless sensor node.

16. The system of claim 11, wherein the wireless sensor node is configured to determine if a total number of retransmission attempts for one sensor timestamped data has exceeded a retransmission count threshold before retransmitting the timestamped data, wherein the retransmission count threshold is pre-determined integer number.

17. The system of claim 11, wherein the sensor node is configured to determine whether the memory device has available free space before retransmitting the timestamped data.

18. The system of claim 11, wherein a data transmission power of the wireless sensor node is dynamically adjusted according to a received signal strength indication (RSSI) or data packet error rate of a respective wireless network.

* * * * *